(12) United States Patent  
Yamori et al.

(10) Patent No.: US 8,971,409 B2
(45) Date of Patent: Mar. 3, 2015

(54) ENCODING APPARATUS AND DECODING APPARATUS

(71) Applicant: Fujitsu Limited, Kawasaki (JP)

(72) Inventors: Akihiro Yamori, Kawasaki (JP); Satoshi Shimada, Kawasaki (JP); Akira Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/202,426

(22) Filed: Mar. 10, 2014

(65) Prior Publication Data

US 2014/0185677 A1    Jul. 3, 2014

Related U.S. Application Data

(63) Continuation of application No. 13/672,056, filed on Nov. 8, 2012, now Pat. No. 8,761,256, which is a continuation of application No. 12/458,729, filed on Jul. 21, 2009, now Pat. No. 8,576,912.

(30) Foreign Application Priority Data

Sep. 2, 2008    (JP) .................................. 2008-225305

(51) Int. Cl.
*H04N 19/523*    (2014.01)
*H04N 19/51*    (2014.01)
*H04N 19/16*    (2014.01)
(Continued)

(52) U.S. Cl.
CPC ..... *H04N 19/0063* (2013.01); *H04N 19/00715* (2013.01); *H04N 19/00224* (2013.01); *H04N 19/00696* (2013.01); *H04N 19/00024* (2013.01); *H04N 19/00781* (2013.01);
(Continued)

(58) Field of Classification Search
USPC ..................................................... 375/240.15
See application file for complete search history.

(56) References Cited

U.S. PATENT DOCUMENTS 6,584,155 B2    6/2003    Takeda et al.
8,144,776 B2    3/2012    Yamori et al.
(Continued)

FOREIGN PATENT DOCUMENTS

CN    101039433    9/2007
EP    0 955 607    11/1999
(Continued)

OTHER PUBLICATIONS

European Oral Proceedings dated Dec. 22, 2011 issued in corresponding European Patent Application No. 09166101.7.
(Continued)

*Primary Examiner* — Tung Vo
*Assistant Examiner* — Obafemi Sosanya
(74) *Attorney, Agent, or Firm* — Staas & Halsey LLP

(57) ABSTRACT

An encoding apparatus having a direct mode as a prediction mode, when a pixel with opposite parity from a top field to a bottom field, for example, is referred to for obtaining a reference vector in the direct mode, performs correction by adding or subtracting a value corresponding to a half pixel to or from a value of the obtained reference vector. The encoding apparatus, when a pixel with opposite parity is referred to for obtaining a first and a second direct vector by temporally scaling the corrected reference vector, performs correction by adding or subtracting a value corresponding to a half pixel to or from values of the obtained direct vectors.

2 Claims, 9 Drawing Sheets

(51) Int. Cl.
   *H04N 19/105*   (2014.01)
   *H04N 19/61*    (2014.01)
   *H04N 19/577*   (2014.01)
   *H04N 19/136*   (2014.01)
   *H04N 19/10*    (2014.01)
   *H04N 19/14*    (2014.01)

(52) U.S. Cl.
   CPC ..... *H04N 19/00721* (2013.01); *H04N 7/26127* (2013.01); *H04N 19/00006* (2013.01); *H04N 19/00157* (2013.01)
   USPC ................................. 375/240.15; 375/240.16

(56) References Cited

U.S. PATENT DOCUMENTS

| | | | |
|---|---|---|---|
| 2005/0053149 A1* | 3/2005 | Mukerjee et al. | ........ 375/240.16 |
| 2005/0053292 A1 | 3/2005 | Mukerjee et al. | |
| 2005/0147171 A1 | 7/2005 | Nakagawa et al. | |
| 2006/0256866 A1* | 11/2006 | Ziauddin et al. | ......... 375/240.15 |
| 2008/0063075 A1 | 3/2008 | Kondo et al. | |

FOREIGN PATENT DOCUMENTS

| | | |
|---|---|---|
| EP | 1 406 453 | 4/2004 |
| EP | 1 408 694 | 4/2004 |
| EP | 1 562 385 | 8/2005 |
| EP | 1 835 748 | 9/2007 |
| JP | 2004-048632 | 2/2004 |
| JP | 2004-56400 | 2/2004 |
| JP | 2005-510984 | 4/2005 |
| WO | 03/047271 | 6/2003 |

OTHER PUBLICATIONS

Chinese Office Action mailed May 3, 2012 issued in corresponding Chinese Patent Application No. 200910163336.9.
U.S. Notice of Allowance for co-pending U.S. Appl. No. 12/458,729, mailed on Mar. 14, 2013.
U.S. Office Action for co-pending U.S. Appl. No. 12/458,729, mailed Nov. 22, 2011, 16 pages.
U.S. Office Action for co-pending U.S. Appl. No. 12/458,729, mailed Jul. 3, 2012, 11 pages.
U.S. Notice of Allowance for co-pending U.S. Appl. No. 13/672,056, mailed Dec. 10, 2013, 16 pages.
U.S. Office Action for co-pending U.S. Appl. No. 13/672,056, mailed Aug. 5, 2013, 23 pages.

* cited by examiner

FIG.1A

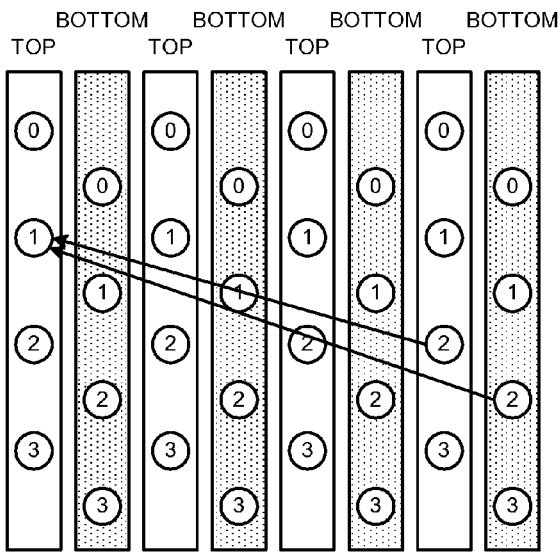

FIG.1B

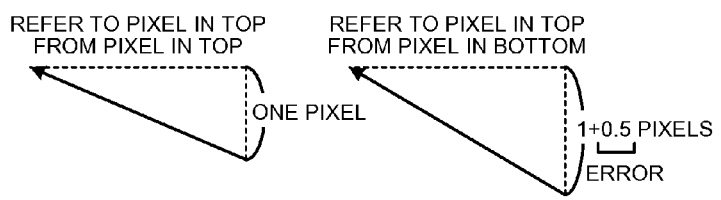

FIG.1C $$\text{(A)} \quad \begin{array}{c} \text{CORRECTED} \\ \text{REFERENCE VECTOR} \end{array} = \begin{array}{c} \text{REFERENCE} \\ \text{VECTOR} \end{array} + 2 \times \underbrace{\left( \begin{array}{c} \text{PARITY OF} \\ \text{REFERENCE} \\ \text{PICTURE IN PAST} \\ \text{DIRECTION} \end{array} - \begin{array}{c} \text{PARITY OF} \\ \text{REFERENCE} \\ \text{PICTURE IN} \\ \text{FUTURE} \\ \text{DIRECTION} \end{array} \right)}_{(0.5 \text{ PIXEL})}$$

$$\text{(B)} \quad \begin{array}{c} \text{CORRECTED DIRECT} \\ \text{VECTOR IN FORWARD} \\ \text{DIRECTION} \end{array} = \begin{array}{c} \text{DIRECT} \\ \text{VECTOR IN} \\ \text{FORWARD} \\ \text{DIRECTION} \end{array} + 2 \times \underbrace{\left( \begin{array}{c} \text{PARITY OF} \\ \text{REFERENCE} \\ \text{PICTURE IN PAST} \\ \text{DIRECTION} \end{array} - \begin{array}{c} \text{PARITY OF} \\ \text{CURRENT} \\ \text{PICTURE} \end{array} \right)}_{(0.5 \text{ PIXEL})}$$

$$\text{(C)} \quad \begin{array}{c} \text{CORRECTED DIRECT} \\ \text{VECTOR IN BACKWARD} \\ \text{DIRECTION} \end{array} = \begin{array}{c} \text{DIRECT} \\ \text{VECTOR IN} \\ \text{BACKWARD} \\ \text{DIRECTION} \end{array} + 2 \times \underbrace{\left( \begin{array}{c} \text{PARITY OF} \\ \text{REFERENCE} \\ \text{PICTURE IN} \\ \text{FUTURE} \\ \text{DIRECTION} \end{array} - \begin{array}{c} \text{PARITY OF} \\ \text{CURRENT} \\ \text{PICTURE} \end{array} \right)}_{(0.5 \text{ PIXEL})}$$

ENCODING APPARATUS AND DECODING APPARATUS

CROSS-REFERENCE TO RELATED APPLICATION

This application is a U.S. Continuation application claiming priority benefit of U.S. Ser. No. 13/672,056, filed on Nov. 8, 2012, which was a Continuation application of U.S. Ser. No. 12/458,729, filed on Jul. 21, 2009, now U.S. Pat. No. 8,576,912, issued Nov. 5, 2013, which was based upon and claimed the benefit of priority of the prior Japanese Patent Application No. 2008-225305, filed on Sep. 2, 2008, the entire contents of which are incorporated herein by reference.

FIELD

The embodiments discussed herein are directed to an encoding apparatus and a decoding apparatus.

BACKGROUND

H. 264 and Moving Picture Experts Group-4 (MPEG-4) Part 10 Advanced Video Coding (AVC) have been standardized as methods for encoding moving image data, and brought to attention. Because the H. 264 and the MPEG-4 Part 10 AVC are technologically the same, they will be referred to as H. 264/AVC in the following.

The H. 264/AVC has five encoding modes including an intra prediction, a forward prediction, a backward prediction, a bidirectional prediction, and a direct mode, as encoding modes for a bi-directional predictive picture (B-picture). In particular, the direct mode is a newly added mode, and is a method to determine a motion vector of a current macroblock from motion vectors of temporally or spatially adjacent macroblocks, by focusing on the continuity of the moving image data.

The principle of a temporal direct mode in the direct modes will now be described with reference to FIG. 9. FIG. 9 is a schematic of a direct vector (frame structure). The temporal direct mode is simply referred to as direct mode.

In the direct mode, a motion vector of a macroblock included in a picture processed immediately before and placed at the same position as the current macroblock is selected as a reference vector, and a motion vector of the current macroblock (hereinafter, referred to as direct vector) is determined by temporally scaling the selected reference vector. In a normal encoding order of moving image data, a certain B-picture is processed subsequent to a reference picture in the forward direction (in the past direction temporally) and a reference picture in the backward direction (in the future direction temporally). Accordingly, a picture processed immediately before the certain B picture is a reference picture in the future direction temporally.

Generally, a reference picture in the past direction is called List0, and a reference picture in the future direction is called List1. In the direct mode, as depicted in FIG. 9, a motion vector of a macroblock (refPicCol is a picture to be referenced) placed at the same position as the reference picture in the future direction (colPic: a picture of Ref_idx=0 of List1) is selected as a reference vector (mvCol). By temporally scaling (at a spacing ratio of picture order count (POC)) the selected reference vector, a direct vector in the forward direction (mvL0) and a direct vector in the backward direction (mvL1) of the macroblock on the current B picture (CurrPic) are determined.

More specifically, the direct mode is performed based on the following principle. Assume that a macroblock placed at the same position as that on the reference picture in the future direction (colPic) has predicted and indicated a region on the reference picture in the past direction, by a reference vector (mvCol). In this case, it is likely to consider that a certain object included in the reference picture in the future direction (colPic) moved from the reference picture in the past direction (refPicCol) along a vector, which is the reference vector (mvCol), in space time. If this is so, the object also passes through the current picture (CurrPic) interposed between the reference picture in the future direction (colPic) and the reference picture in the past direction (refPicCol), along the reference vector (mvCol). Based on the assumption, in the direct mode, the macroblock on the current picture (CurrPic) is predicted from the reference picture in the future direction (colPic) and the reference picture in the past direction (refPicCol), by using a vector parallel to the reference vector (mvCol) in space time. Formulae for calculating a vector parallel to the reference vector (mvCol) that indicates from the reference picture in the future direction (colPic) to the reference picture in the past direction (refPicCol) in space time, between CurrPic and refPicCol, and between CurrPic and colPic are depicted below.

Formulae for calculating a normal direct vector are as follows: mvL0 is a direct vector from the current picture (CurrPic) to the reference picture in the past direction (refPicCol), and mvL1 is a direct vector from the current picture (CurrPic) to the reference picture in the future direction (colPic).

$$mvL0 = mvCol \times tb/td \quad (1)$$

$$mvL1 = mvL0 - mvCol \quad (2)$$

where td is the time distance from the reference picture in the future direction (colPic) to the reference picture in the past direction (refPicCol), and tb is the time distance from the current picture (CurrPic) to the reference picture in the past direction (refPicCol). The direct vectors (mvL0 and mvL1) determined here are calculated on assumption that the picture has a frame structure.

The vector in the forward direction and the vector in the backward direction are used as examples for conveniently explaining the direct vector. However, the vectors mvL0 and mvL1 are not fixed to either of the forward direction or the backward direction, in the H. 264 and MPEG-4 Part 10 AVC. Accordingly, the similar calculation can be carried out by using a vector of the combination of the forward direction/forward direction or the backward direction/backward direction. In the following description on the direct vector, the vectors mvL0 and mvL1 used for calculation are referred to as a first vector (direct vector) and a second vector (direct vector).

For example, methods of switching coefficients depending on the time distance, if a pixel with opposite parity is referred to, while a picture having a field structure is encoded in the direct mode, have been disclosed.

In the technologies disclosed in, for example, Japanese Laid-open Patent Publication No. 2004-048632 and Published Japanese Translation of PCT Application No. 2005-510984.

In the conventional technologies, the encoding efficiency is decreased, when a picture having a field structure is encoded in the direct mode. In other words, in the conventional technologies, if a pixel with opposite parity is referred to, while a picture having a field structure is encoded in the direct mode, an error corresponding to the difference in the parities occurs in the vector. Accordingly, the encoding efficiency is decreased.

FIG. 10 is a schematic of a direct vector (field structure). As depicted in FIG. 10, in a picture having a field structure, pixels in the Bottom_field are shifted in the downward direction by 0.5 pixel across the field, compared with the pixels in the Top_field. Accordingly, with a vector obtained by referring to a pixel with opposite parity, while a picture having a field structure is encoded in the direct mode, the direct vectors mvL0 and mvL1 do not become parallel to the reference vector (mvCol) in space time. Such a direct vector is not the maximum likelihood, thereby decreasing the encoding efficiency.

SUMMARY

According to an aspect of the invention, an encoding apparatus having a direct mode as a prediction mode includes a reference vector correcting unit that, when a pixel with opposite parity is referred to for obtaining a reference vector in the direct mode, performs correction by adding or subtracting a value corresponding to a half pixel to or from a value of the obtained reference vector; and a direct vector correcting unit that, when a pixel with opposite parity is referred to for obtaining a first and a second direct vector by temporally scaling the reference vector corrected by the reference vector correcting unit, performs correction by adding or subtracting a value corresponding to a half pixel to or from values of obtained direct vectors.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a schematic of an outline of an encoding apparatus and a decoding apparatus according to a first embodiment of the present invention;

FIG. 1B is a diagram for explaining the outline of the encoding apparatus;

FIG. 1C is formulae for explaining the outline of the encoding apparatus;

DESCRIPTION OF EMBODIMENTS

Figure 2:
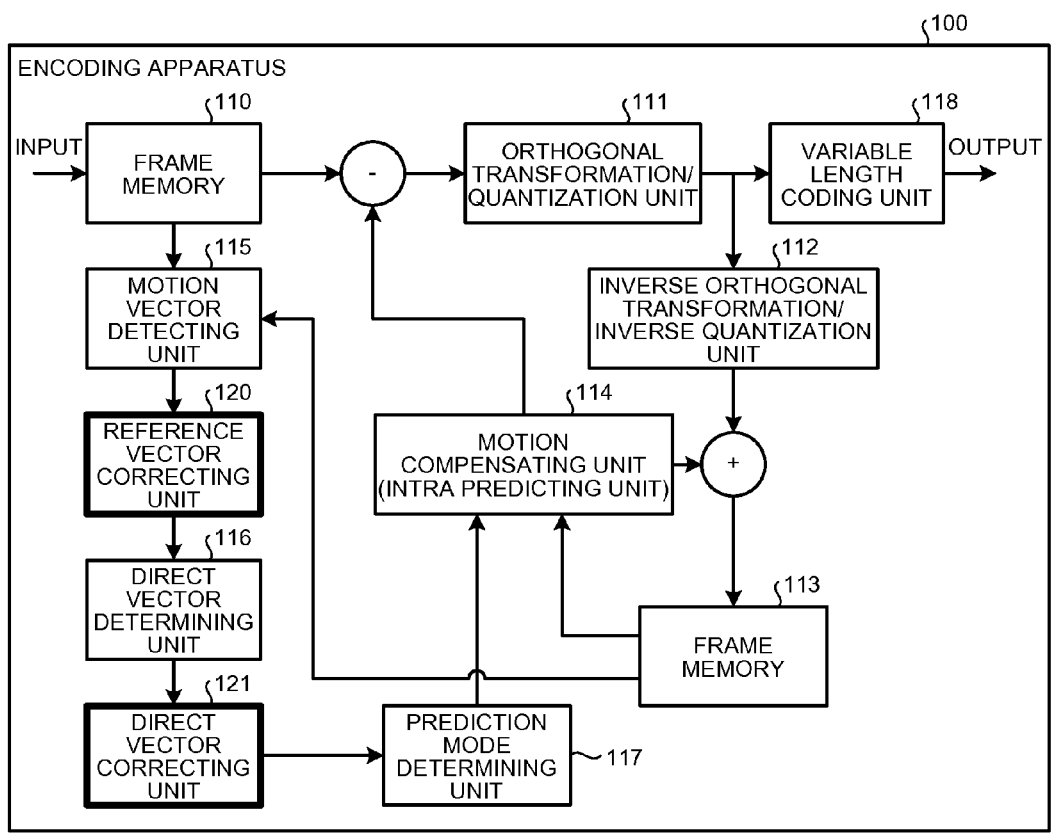
FIG. 2 is a block diagram of a configuration of the encoding apparatus according to the first embodiment.

Preferred embodiments of the present invention will be explained with reference to accompanying drawings. Outlines of an encoding apparatus and a decoding apparatus according to a first embodiment of the present invention are described first, followed by a configuration of the encoding apparatus and its processing procedure, a configuration of the decoding apparatus and its processing procedure according to the first embodiment, and advantages of the first embodiment. Other embodiments will be explained in the end.

[a] First Embodiment

Outlines of Encoding Apparatus and Decoding Apparatus

With reference to FIGS. 1A to 1C, outlines of the encoding apparatus and the decoding apparatus according to the first embodiment of the present invention will be described. FIGS. 1A to 1C depict the outlines of the encoding apparatus and the decoding apparatus according to the first embodiment.

As depicted in FIG. 1A, if a pixel with opposite parity is referred to, while a picture having a field structure is encoded in the direct mode, an error corresponding to the difference in the parities occurs in the vector. For example, as depicted in FIG. 1A, if a pixel "2" in a Top_field refers to a pixel "1" in a Top_field, the vertical component of a vector is "one pixel" derived from "2"–"1" (see FIG. 1B), and a value of the vertical component of the vector is correctly calculated as "–4 (1 pixel/0.25 pixel)".

As depicted in FIG. 1A, if a pixel "2" in a Bottom_field refers to a pixel "1" in a Top_field, a vertical component of a vector is also "one pixel" derived from "2"–"1", and a value of the vertical component of the vector is also calculated as "–4 (1 pixel/0.25 pixel)". However, in a picture having a field structure, as depicted in FIG. 1A, the pixels in the Bottom_field are shifted by 0.5 pixel across the field in the downward direction, compared with the pixels in the Top_field. Accordingly, under normal circumstances, the vertical component of the vector should be "1.5 pixel" (see FIG. 1B), and the value of the vertical component of the vector should be calculated as "–6 (1.5 pixel/0.25 pixel)".

In this manner, if a pixel with opposite parity is referred to, an error of 0.5 pixel corresponding to the difference in the parities occurs in the vector. Accordingly, the encoding apparatus and the decoding apparatus according to the first embodiment correct the error.

More specifically, the encoding apparatus and the decoding apparatus according to the first embodiment correct a reference vector and a direct vector, by using three formulae depicted in FIG. 1C. Formula (A) in FIG. 1C is a formula for correcting a reference vector. As depicted in Formula (A), the encoding apparatus and the decoding apparatus according to the first embodiment, if parity of a reference picture in the past direction and a parity of a reference picture in the future direction are different, perform correction by adding or subtracting "2" corresponding to 0.5 pixel, to or from a value of the reference vector.

Formula (B) in FIG. 1C is a formula for correcting a first direct vector. As depicted in Formula (B), the encoding apparatus and the decoding apparatus according to the first embodiment, if a parity of a reference picture in the past direction and a parity of a current picture are different, perform correction by adding or subtracting "2" corresponding to 0.5 pixel, to or from a value of the first direct vector.

Formula (C) in FIG. 1C is a formula for correcting a second direct vector. As depicted in Formula (C), the encoding apparatus and the decoding apparatus according to the first embodiment, if a parity of a reference picture in the future direction and a parity of the current picture are different, perform correction by adding or subtracting "2" corresponding to 0.5 pixel, to or from a value of the second direct vector.

In this manner, the encoding apparatus and the decoding apparatus according to the first embodiment perform correction by adding or subtracting an error, which is a half pixel corresponding to the difference in the parities. Accordingly, the vector is properly corrected, thereby preventing the encoding efficiency from being decreased.

[Configuration of Encoding Apparatus]

A configuration of the encoding apparatus according to the first embodiment will now be described with reference to FIG. 2. FIG. 2 is a block diagram of the configuration of the encoding apparatus according to the first embodiment.

As depicted in FIG. 2, an encoding apparatus 100 according to the first embodiment includes a frame memory 110, an orthogonal transformation/quantization unit 111, an inverse orthogonal transformation/inverse quantization unit 112, a frame memory 113, and a motion compensating unit (intra predicting unit) 114. The encoding apparatus 100 also includes a motion vector detecting unit 115, a direct vector determining unit 116, a prediction mode determining unit 117, and a variable length coding unit 118. These units are the same as those included in a conventional encoding apparatus. Additionally, the encoding apparatus 100 according to the first embodiment includes a reference vector correcting unit 120 and a direct vector correcting unit 121 as indicated by the thick frames in FIG. 2.

A normal processing performed by the encoding apparatus 100 according to the first embodiment will be described. The encoding apparatus 100 stores an input image into the frame memory 110 and divides the input image into macroblock units. The encoding apparatus 100 performs processing in a macroblock unit.

In the encoding apparatus 100, the motion vector detecting unit 115 detects a motion vector of the input image stored in the frame memory 110, from a reference image stored in the frame memory 113. The motion compensating unit 114 then generates a prediction image, by using the reference image stored in the frame memory 113 and the motion vector detected by the motion vector detecting unit 115.

The prediction mode determining unit 117 determines a prediction mode capable of efficient encoding, by comparing between an encoding of the prediction image generated by the motion compensating unit 114 and an encoding of the input image. If the prediction mode determining unit 117 determines that an interframe coding is performed, a prediction difference image that is a difference between the input image stored in the frame memory 110 and the prediction image generated by the motion compensating unit 114 is fed into the orthogonal transformation/quantization unit 111. If the prediction mode determining unit 117 determines that an intraframe coding is performed, the input image stored in the frame memory 110 is directly fed into the orthogonal transformation/quantization unit 111.

The orthogonal transformation/quantization unit 111 orthogonally transforms and quantizes the prediction difference image and feeds into the variable length coding unit 118. The variable length coding unit 118 encodes the prediction difference image and outputs the image as a bit stream. The prediction difference image orthogonally transformed and quantized by the orthogonal transformation/quantization unit 111 is inversely orthogonally transformed and is inversely quantized by the inverse orthogonal transformation/inverse quantization unit 112, for the motion compensation prediction performed in the next frame. The prediction difference image is decoded by using the prediction image generated by the motion compensating unit 114 and is stored in the frame memory 113.

The encoding apparatus 100 according to the first embodiment includes the reference vector correcting unit 120 and the direct vector correcting unit 121. The reference vector correcting unit 120 and the direct vector correcting unit 121 operate when the input image is a picture having a field structure and is in the temporal direct mode.

The reference vector correcting unit 120, when a reference vector is detected by the motion vector detecting unit 115, determines whether a pixel with opposite parity is referred to. If it is determined that a pixel with opposite parity is referred to, the reference vector correcting unit 120 performs correction by adding or subtracting a value corresponding to 0.5 pixel, to or from a value of the reference vector value being detected. The reference vector correcting unit 120 then transmits the corrected reference vector to the direct vector determining unit 116.

More specifically, the reference vector correcting unit 120 performs correction by using the following formulae. The calculation is performed based on 0.25 pixel accuracy. The variables will now be described.

isBottomFieldCurr: parity (Top:0, Bottom:1) of a current picture (CurrPic)

isBottomFieldCol: parity (Top:0, Bottom:1) of a reference picture in the future direction (colPic)

isBottomFieldrefPicCol: parity (Top:0, Bottom:1) of a reference picture in the past direction (refPicCol)

mvCol_correct: corrected value of a reference vector (mvCol)

mvL0_correct: corrected value of a first direct vector (mvL0)

mvL1_correct: corrected value of a second direct vector (mvL1)

The reference vector correcting unit 120 performs correction using Formula (3), by considering the parity of the reference picture in the future direction (colPic), which is a reference source of a reference vector (mvCol), and the parity of a reference picture in the past direction (refPicCol), which is a picture to be referenced.

$$mvCol\_correct = mvCol + 2 \times (isBottomFieldrefPicCol - isBottomFieldCol) \quad (3)$$

By using Formula (3), regardless of parity, it is possible to calculate the correct direction of the reference vector (mvCol) in space time.

If it is determined that a pixel with opposite parity is not referred to, the reference vector correcting unit 120 transmits the reference vector detected by the motion vector detecting unit 115 to the direct vector determining unit 116.

The direct vector determining unit 116 calculates a direct vector by using the corrected reference vector transmitted from the reference vector correcting unit 120, and transmits the calculated direct vector to the direct vector correcting unit 121.

More specifically, the direct vector determining unit 116 performs correction using Formulae (4) and (5). In other words, the direct vector determining unit 116 calculates a direct vector parallel to the corrected reference vector (mvCol_correct), by using the corrected reference vector (mvCol_correct) and a distance of each picture in the temporal direction.

$$mvL0 = mvCol\_correct \times tb/td \quad (4)$$

$$mvL1 = mvL0 - mvCol\_correct \quad (5)$$

The direct vector correcting unit 121 determines whether the direct vector transmitted from the direct vector determining unit 116 is obtained by referring to a pixel with opposite parity. If it is determined that a pixel with opposite parity is referred to, the direct vector correcting unit 121 performs correction by adding or subtracting a value corresponding to 0.5 pixel, to or from a value of the transmitted direct vector. The direct vector correcting unit 121 then transmits the corrected direct vector to the prediction mode determining unit 117.

More specifically, the direct vector correcting unit 121 performs correction on the first direct vector (mvL0), using Formula (6), by considering the parity between the current picture (CurrPic) and the reference picture in the past direction (refPicCol). The direct vector correcting unit 121 performs correction on the second director vector (mvL1), using Formula (7), by considering the parity between the current picture (CurrPic) and the reference picture in the future direction (colPic).

$$mvL0\_correct = mvL0 + 2 \times (\text{isBottomFieldrefPic}Col - \text{isBottomFieldCurr}) \quad (6)$$

$$mvL1\_correct = mvL1 + 2 \times (\text{isBottomField}Col - \text{isBottomFieldCurr}) \quad (7)$$

If it is determined that a pixel with opposite parity is not referred to, the direct vector correcting unit 121 transmits the direct vector transmitted from the direct vector determining unit 116 to the prediction mode determining unit 117.

[Processing Procedure Performed by Encoding Apparatus]

Figure 3:
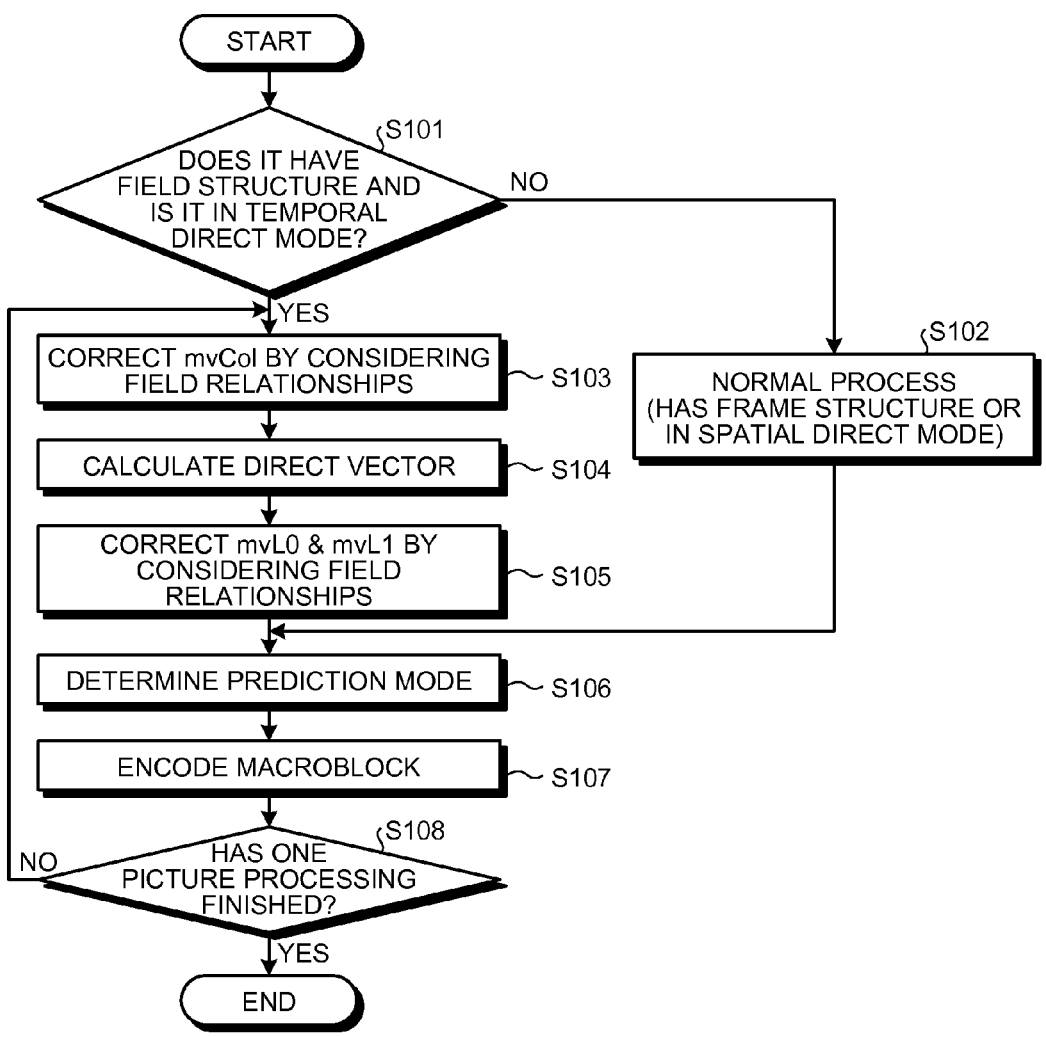
FIG. 3 is a flowchart of a processing procedure performed by the encoding apparatus according to the first embodiment.

A processing procedure performed by the encoding apparatus according to the first embodiment will now be described with reference to FIG. 3. FIG. 3 is a flowchart of the processing procedure performed by the encoding apparatus according to the first embodiment. The processing procedure depicted in FIG. 3 is the detailed processing procedure performed when an input image is a picture having a field structure and is in the temporal direct mode.

The encoding apparatus 100 determines whether an input image has a field structure and is in the temporal direct mode (Step S101). If the input image does not have a field structure nor is in the temporal direct mode (No at Step S101), the encoding apparatus 100 performs a normal process (Step S102), and proceeds to Step S106.

If the input image has a field structure and is in the temporal direct mode (Yes at Step S101), the reference vector correcting unit 120 corrects the reference vector by considering the field relationships (Step S103).

The direct vector determining unit 116 then calculates a direct vector (Step S104). Subsequently, the direct vector correcting unit 121 corrects the first direct vector and the second direct vector by considering the field relationships (Step S105).

The prediction mode determining unit 117 then determines a prediction mode (Step S106). Subsequently, the macroblock is encoded by the orthogonal transformation/quantization unit 111 and the variable length coding unit 118 (Step S107).

The encoding apparatus 100 determines whether a processing of one picture has finished (Step S108). If the processing of one picture has finished (Yes at Step S108), the encoding apparatus 100 finishes the process. If the processing of one picture is not yet finished (No at Step S108), the encoding apparatus 100 returns to the process in which the reference vector correcting unit 120 corrects a reference vector (Step S103).

[Configuration of Decoding Apparatus]

Figure 4:
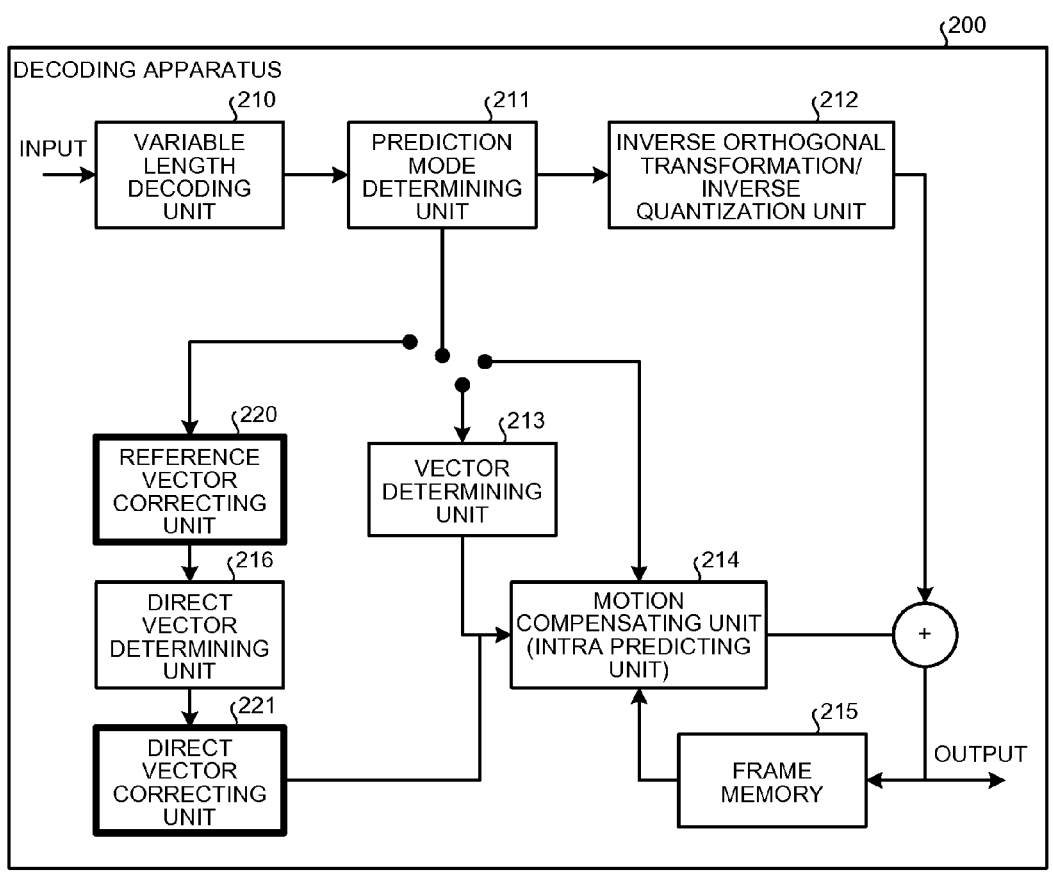
FIG. 4 is a block diagram of a configuration of the decoding apparatus according to the first embodiment.

A configuration of a decoding apparatus according to the first embodiment will now be described with reference to FIG. 4. FIG. 4 is a block diagram of the configuration of the decoding apparatus according to the first embodiment.

As depicted in FIG. 4, a decoding apparatus 200 according to the first embodiment includes a variable length decoding unit 210, a prediction mode determining unit 211, and an inverse orthogonal transformation/inverse quantization unit 212. The decoding apparatus 200 also includes a vector determining unit 213, a motion compensating unit (intra predicting unit) 214, a frame memory 215, and a direct vector determining unit 216. These units are the same as those included in a conventional decoding apparatus. Additionally, the decoding apparatus 200 according to the first embodiment includes a reference vector correcting unit 220 and a direct vector correcting unit 221 as indicated by the thick frames in FIG. 4.

A normal processing performed by the decoding apparatus 200 according to the first embodiment will now be described. The decoding apparatus 200 feeds a bit stream transmitted from the encoding apparatus 100 into the variable length decoding unit 210. The variable length decoding unit 210 decodes the upper level header information of the input bit stream, and divides into macroblock units. The decoding apparatus 200 performs processing in a macroblock unit.

In the decoding apparatus 200, the prediction mode determining unit 211 determines a prediction mode of decoding data in a macroblock unit. If the prediction mode determining unit 211 determines that an interframe coding is performed, the vector determining unit 213 extracts a motion vector from the bit stream. The motion compensating unit 214 then generates a prediction image, by using the motion vector extracted by the vector determining unit 213 and a decoded image stored in the frame memory 215. The prediction image generated by the motion compensating unit 214 is added to the decoded result of the prediction difference image generated by the inverse orthogonal transformation/inverse quantization unit 212, and is output as a decoded image.

If the prediction mode determining unit 211 determines that an intraframe coding is performed, the signal extracted from the bit stream is directly decoded by the inverse orthogonal transformation/inverse quantization unit 212, and output as a decoded image. The decoded image is stored in the frame memory 215, for the motion compensation process performed in the next frame.

The decoding apparatus 200 according to the first embodiment includes the reference vector correcting unit 220 and the direct vector correcting unit 221. The reference vector correcting unit 220 and the direct vector correcting unit 221 operate when the input image is a picture having a field structure and is in the temporal direct mode.

The reference vector correcting unit 220 determines whether a pixel with opposite parity is referred to, when a reference vector is determined by the vector determining unit 213. If it is determined that a pixel with opposite parity is referred to, the reference vector correcting unit 220 performs correction by adding or subtracting a value corresponding to 0.5 pixel, to or from a value of the detected reference vector. The reference vector correcting unit 220 then transmits the corrected reference vector to the direct vector determining unit 216.

More specifically, the reference vector correcting unit 220 performs correction by using the following formula. The calculation is performed based on 0.25 pixel accuracy. The variables will now be described.

isBottomFieldCurr: parity (Top:0, Bottom:1) of a current picture (CurrPic)

isBottomFieldCol: parity (Top:0, Bottom:1) of a reference picture in the future direction (colPic)

isBottomFieldrefPicCol: parity (Top:0, Bottom:1) of a reference picture in the past direction (refPicCol)

mvCol_correct: corrected value of a reference vector (mvCol)

mvL0_correct: corrected value of a first direct vector (mvL0)

mvL1_correct: corrected value of a second direct vector (mvL1)

The reference vector correcting unit 220 performs correction using Formula (8), by considering the parity of the reference picture in the future direction (colPic), which is a reference source of the reference vector (mvCol), and the parity of the reference picture in the past direction (refPicCol), which is a picture to be referenced.

$$mvCol\_correct = mvCol + 2 \times (isBottomFieldrefPicCol - isBottomFieldCol) \quad (8)$$

By using Formula (8), regardless of parity, it is possible to calculate the correct direction of the reference vector (mvCol) in space time.

If it is determined that a pixel with opposite parity is not referred to, the reference vector correcting unit 220 transmits the reference vector determined by the vector determining unit 213 to the direct vector determining unit 216.

The direct vector determining unit 216 calculates a direct vector by using the corrected reference vector transmitted from the reference vector correcting unit 220, and transmits the calculated direct vector to the direct vector correcting unit 221.

More specifically, the direct vector determining unit 216 performs correction using Formulae (9) and (10). In other words, the direct vector determining unit 216 calculates a direct vector parallel to the corrected reference vector (mvCol_correct), by using the corrected reference vector (mvCol_correct) and a distance of each picture in the temporal direction.

$$mvL0 = mvCol\_correct \times tb/td \quad (9)$$

$$mvL1 = mvL0 - mvCol\_correct \quad (10)$$

The direct vector correcting unit 221 determines whether the direct vector transmitted from the direct vector determining unit 216 is obtained by referring to a pixel with opposite parity. If it is determined that a pixel with opposite parity is referred to, the direct vector correcting unit 221 performs correction by adding or subtracting a value corresponding to 0.5 pixel to or from a value of the transmitted direct vector. The direct vector correcting unit 221 then transmits the corrected direct vector to the motion compensating unit 214.

More specifically, the direct vector correcting unit 221 performs correction on the first direct vector (mvL0) using Formula (II), by considering the parity between the current picture (CurrPic) and the reference picture in the past direction (refPicCol). The direct vector correcting unit 221 performs correction on the second direct vector (mvL1) using Formula (12), by considering the parity between the current picture (CurrPic) and the reference picture in the future direction (colPic).

$$mvL0\_correct = mvL0 + 2 \times (isBottomFieldrefPicCol - isBottomFieldCurr) \quad (11)$$

$$mvL1\_correct = mvL1 + 2 \times (isBottomFieldCol - isBottomFieldCurr) \quad (12)$$

If it is determined that a pixel with opposite parity is not referred to, the direct vector correcting unit 221 transmits the direct vector transmitted from the direct vector determining unit 216 to the motion compensating unit 214.

[Processing Procedure Performed by Decoding Apparatus]

Figure 5:
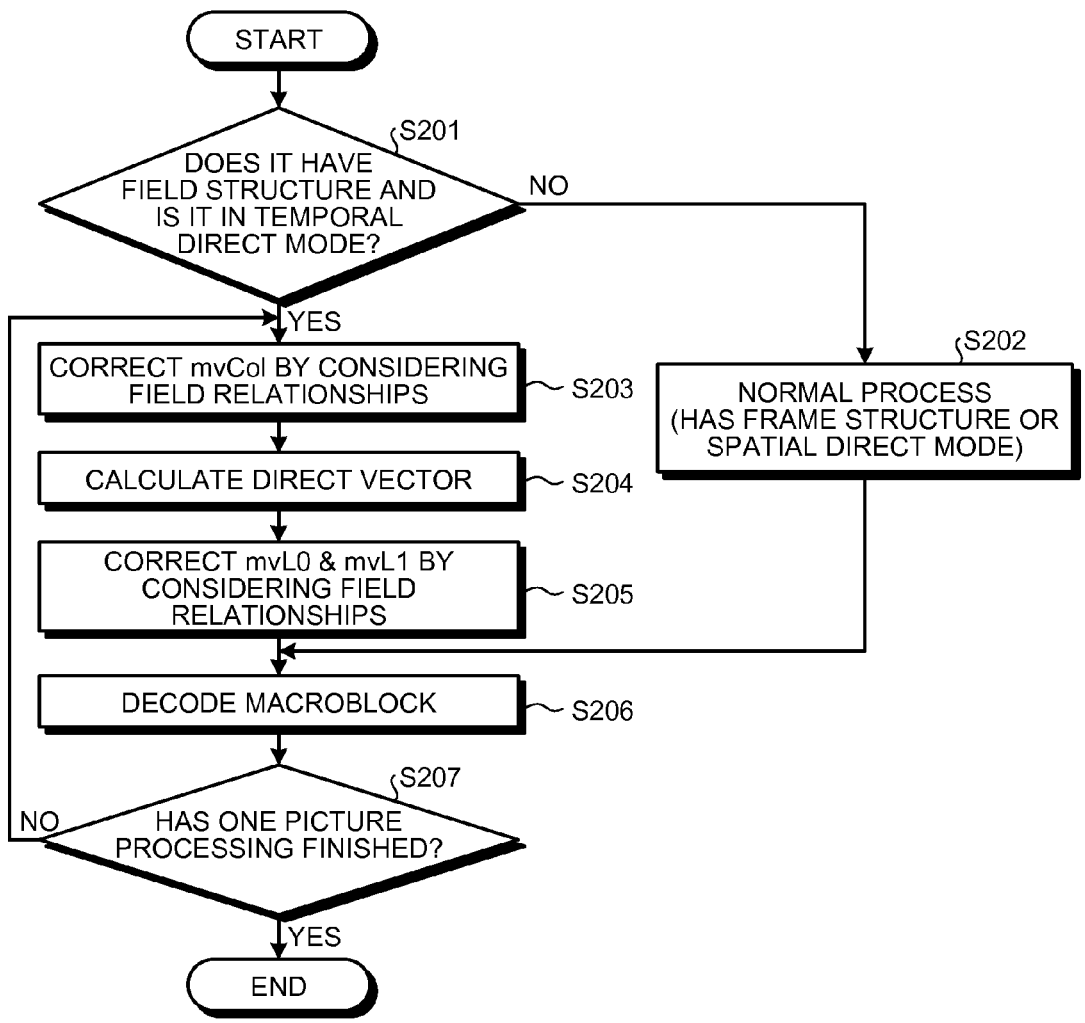
FIG. 5 is a flowchart of a processing procedure performed by the decoding apparatus according to the first embodiment.

With reference to FIG. 5, a processing procedure performed by the decoding apparatus according to the first embodiment will be described. FIG. 5 is a flowchart of the processing procedure performed by the decoding apparatus according to the first embodiment. The processing procedure depicted in FIG. 5 is the detailed processing procedure performed when an input image is a picture having a field structure and is in the temporal direct mode.

In the decoding apparatus 200, the prediction mode determining unit 211 determines whether an input stream has a field structure and is in the temporal direct mode (Step S201). If the input stream does not have a field structure nor is in the temporal direct mode (No at Step S201), the decoding apparatus 200 performs a normal process (Step S202), and proceeds to Step S206.

If the input stream has a field structure and is in the temporal direct mode (Yes at Step S201), the reference vector correcting unit 220 corrects the reference vector by considering the field relationships (Step S203).

The direct vector determining unit 216 then calculates a direct vector (Step S204). Subsequently, the direct vector correcting unit 221 corrects the first direct vector and the second direct vector by considering the field relationships (Step S205). The macroblock is then decoded by the motion compensating unit 214 (Step S206).

The decoding apparatus 200 determines whether a processing of one picture has finished (Step S207). If the processing of one picture has finished (Yes at Step S207), the decoding apparatus 200 finishes the process. If the processing of one picture is not yet finished (No at Step S207), the decoding apparatus 200 returns to the process (Step S203) in which the reference vector correcting unit 220 corrects the reference vector.

[Advantages]

As described above, according to the first embodiment, the encoding apparatus performs correction by adding or subtracting a value corresponding to a half pixel to or from a value of the obtained reference vector, if a pixel with opposite parity is referred to so as to obtain a reference vector in the direct mode. The encoding apparatus performs correction by adding or subtracting a value corresponding to a half pixel to or from a value of the obtained direct vector, if a pixel with opposite parity is referred to so as to obtain a direct vector from the corrected reference vector.

In this manner, with the encoding apparatus according to the first embodiment, the correction is performed by adding or subtracting an error, which is a half pixel corresponding to the difference in parities. Accordingly, the vector is properly corrected, thereby preventing the encoding efficiency from being decreased.

Figure 6A:
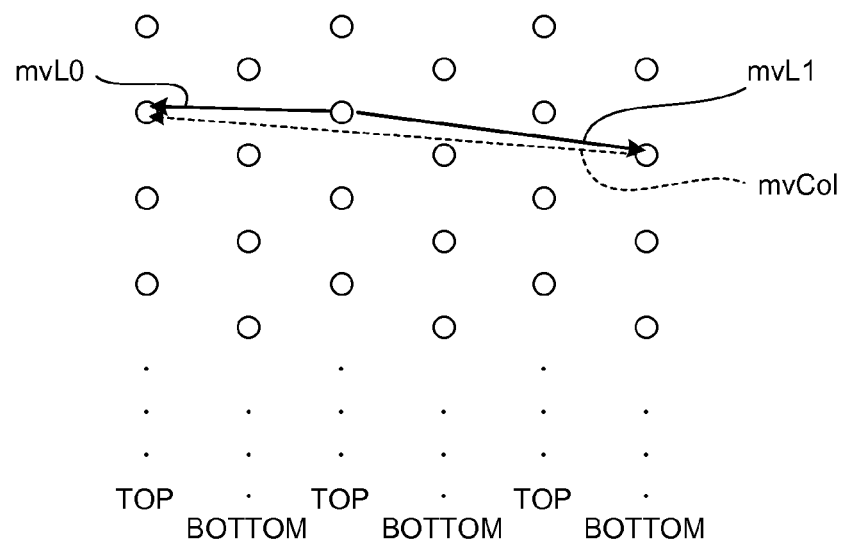
FIGS. 6A and 6B are schematics of advantages of the first embodiment.

In other words, as depicted in FIG. 6A, in the picture having a field structure, the pixels in the Bottom_field are shifted in the downward direction for 0.5 pixel across the field, compared with the pixels in the Top_field. Accordingly, the direct vectors mvL0 and mvL1 do not become parallel to the reference vector (mvCol) in space time, with the vector obtained by referring to a pixel with opposite parity, while the picture having a field structure is encoded in the direct mode. In other words, for example, in FIG. 6A, although the reference vector (mvCol) and the direct vectors mvL0 and mvl1 are all 0 vectors, their directions are all different in relation to the parity. Because the conventional direct vector does not become maximum likelihood, the encoding efficiency is decreased.

Figure 6B:
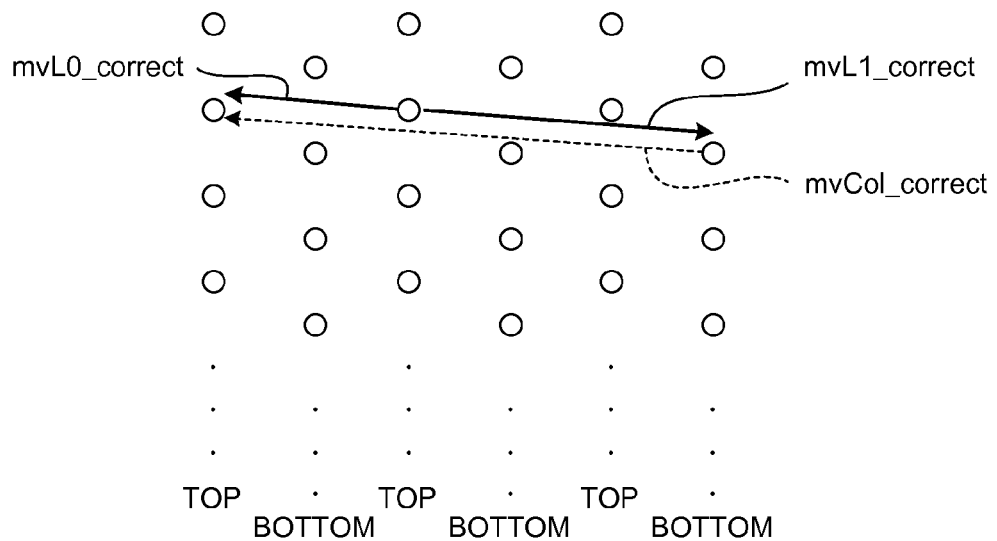

Alternatively, with the encoding apparatus according to the first embodiment, the correction is performed on the reference vector and the direct vector. As a result, as depicted in FIG. 6B, the direct vectors mvL0 and mvL1 become parallel to the reference vector (mvCol) in space time. Because the direct vector becomes maximum likelihood, it is possible to prevent the encoding efficiency from being decreased. However, the reference vector (mvCol) and the direct vectors mvL0 and mvL1 need not necessarily be 0 vectors.

Similarly, according to the first embodiment, if a pixel with opposite parity is referred to so as to obtain the reference vector in the direct mode, the decoding apparatus performs correction by adding or subtracting a value corresponding to a half pixel, to or from a value of the obtained reference vector. If a pixel with opposite parity is referred to so as to obtain the direct vector from the corrected reference vector, the decoding apparatus performs correction by adding or subtracting a value corresponding to a half pixel, to or from a value of the obtained direct vector.

In this manner, with the decoding apparatus according to the first embodiment, the correction is performed by adding or subtracting an error, which is a half pixel corresponding to the difference in parities. Accordingly, the vector is properly corrected, thereby preventing the encoding efficiency from being decreased.

[b] Other Embodiments

While embodiments of the present invention have been described, it is to be understood that various other modifications may be made in addition to the embodiments of the present invention.

[System Configuration Etc.]

In the first embodiment, a method of correcting the reference vector and the direct vector by using both of the encoding apparatus and the decoding apparatus has been described. However, the present invention is not limited thereto. The present invention may similarly be applied to a method in which only the encoding apparatus is used for correction, or a method in which only the decoding apparatus is used for correction.

Of the processes described in the present embodiments, all or a part of the processes described as being automatically performed may be manually performed, or all or a part of the processes described as being manually performed may be automatically performed with a known method. The information including the processing procedure (such as FIGS. 3 and 5), specific names, and various kinds of data and parameters depicted in the specification or in the drawings can be optionally changed, unless otherwise specified.

The respective constituents of each apparatus depicted in the drawings are functionally conceptual, and are not necessarily be physically configured as illustrated (such as FIGS. 2 and 4). In other words, the specific mode of dispersion and integration of each apparatus is not limited to the ones depicted in the drawings, and all or a part of the apparatus can be functionally or physically dispersed or integrated in an optional unit, depending on various kinds of load and the status of use. All or an optional part of the respective processing functions carried out in each apparatus are realized by a central processing unit (CPU) and a computer program analyzed and executed by the CPU, or may be realized as hardware by the wired logic.

[Encoding Program and Decoding Program]

Figure 7:
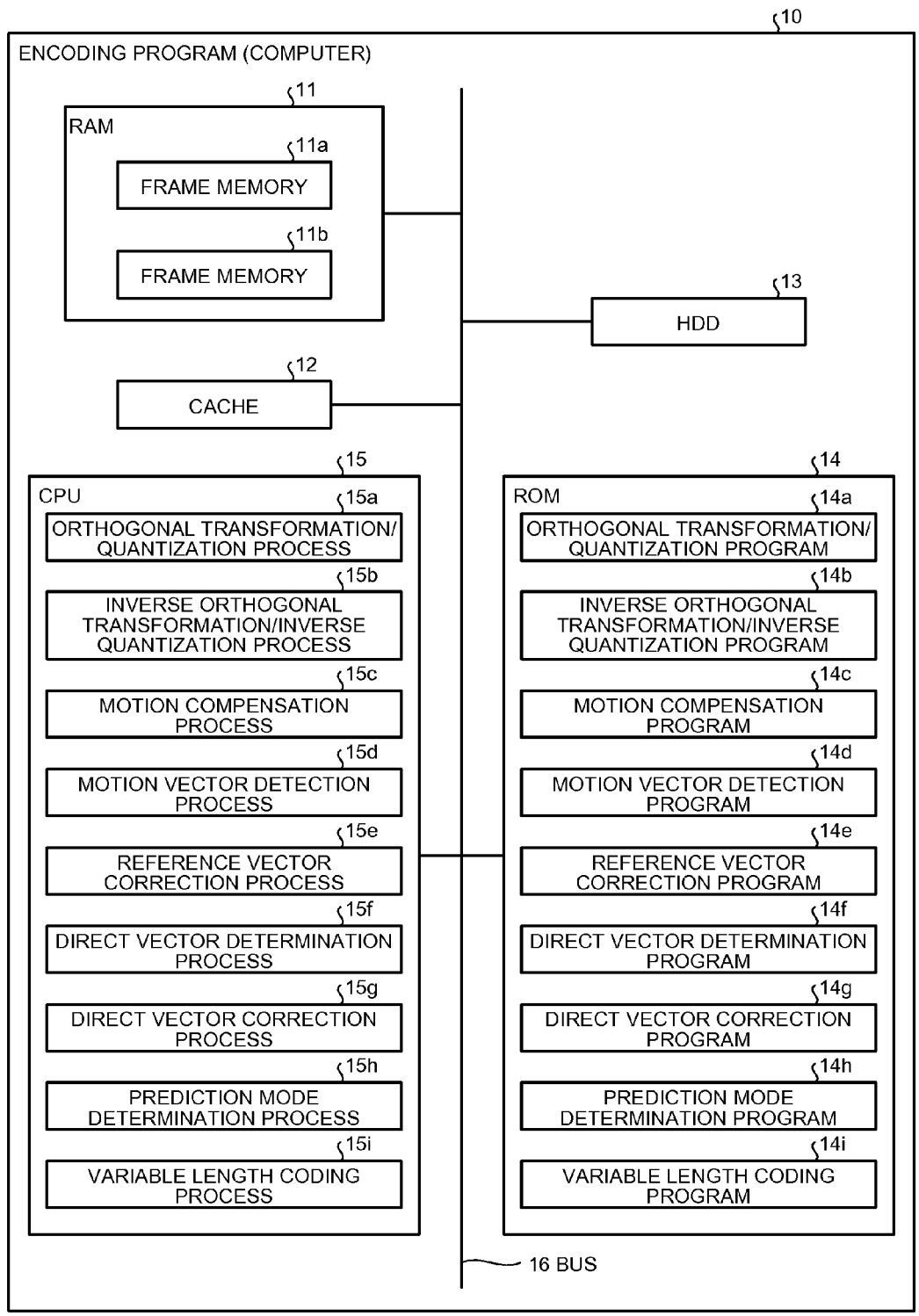
FIG. 7 is a schematic of a computer that executes an encoding program.
Figure 8:
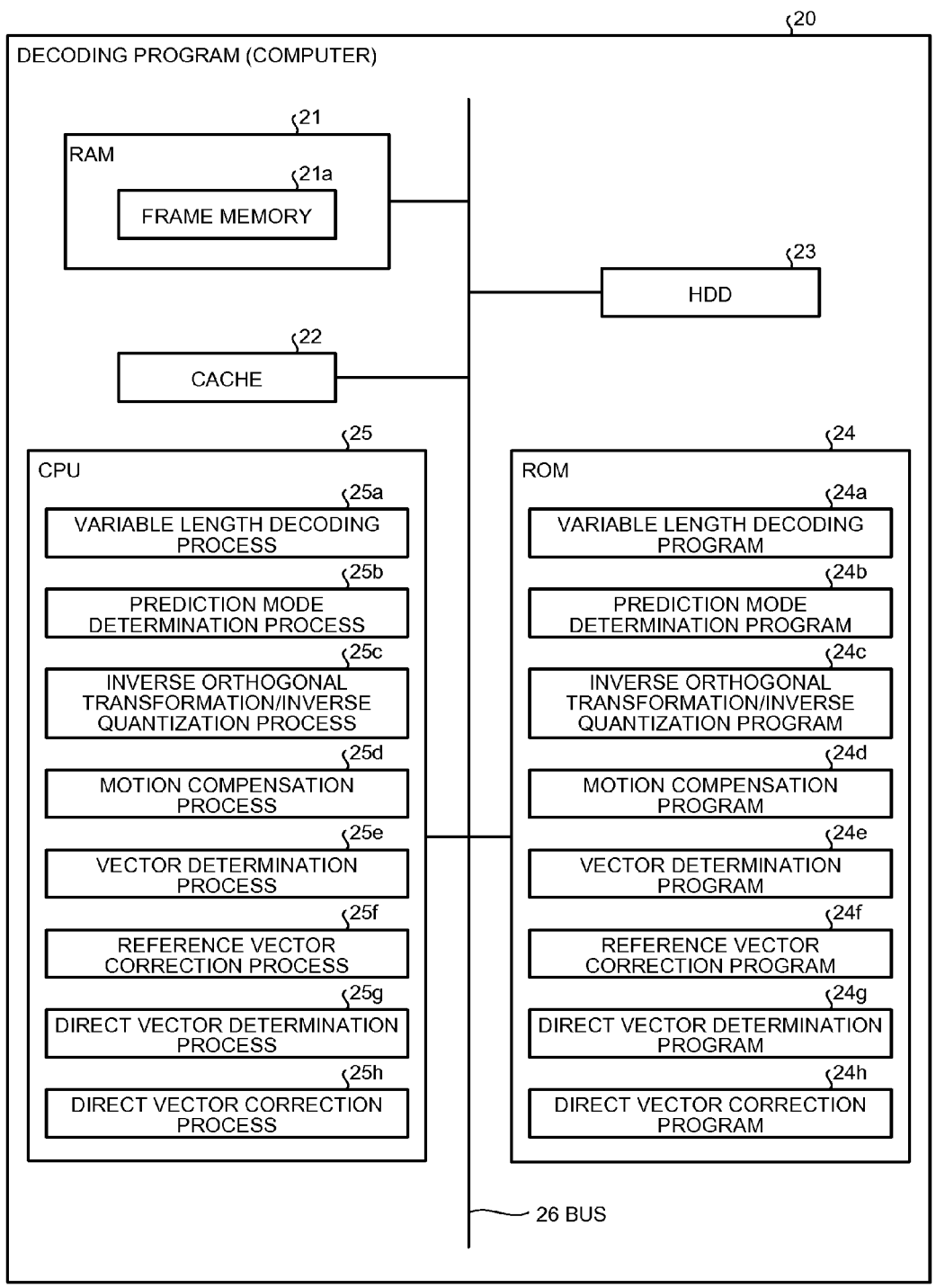
FIG. 8 is a schematic of a computer that executes a decoding program.
Figure 9:
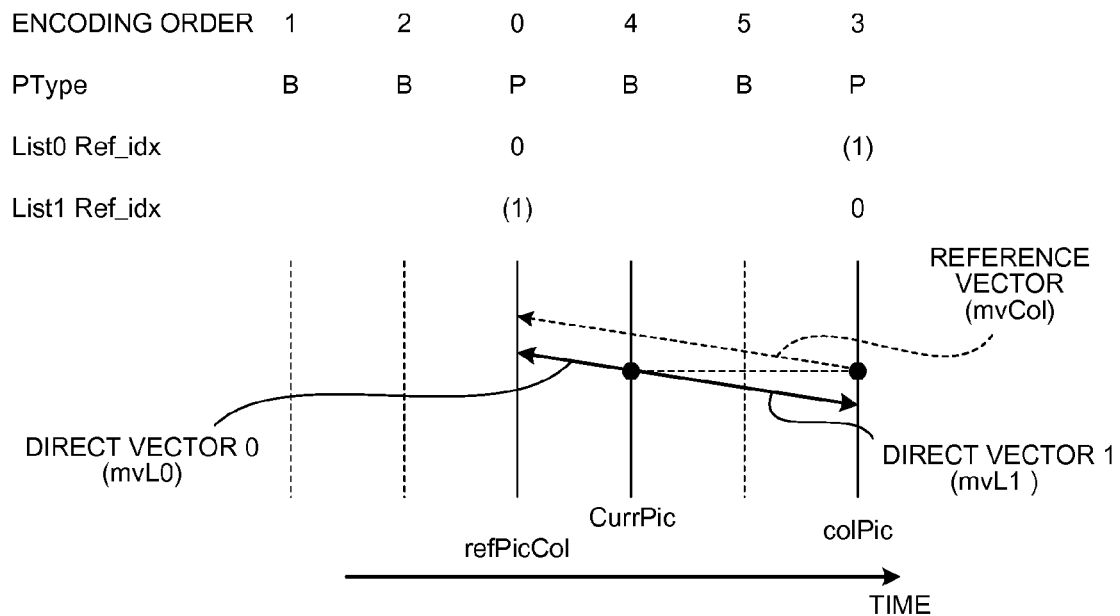
FIG. 9 is a schematic of a direct vector (frame structure)
Figure 10:
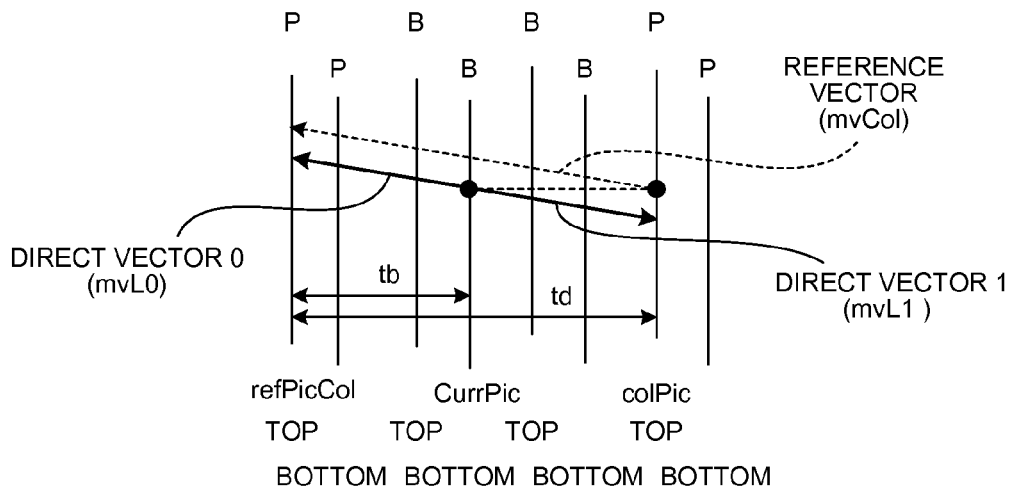
FIG. 10 is a schematic of a direct vector (field structure).

Various types of processing described in the embodiments can be realized by executing prepared computer programs with a computer such as a personal computer and a work station. With reference to FIGS. 7 and 8, examples of a computer that executes an encoding program and a computer that executes a decoding program having the similar functions as those of the embodiments will now be described. FIG. 7 is a schematic of a computer that executes the encoding program, and FIG. 8 is a schematic of a computer that executes the decoding program.

As depicted in FIG. 7, an encoding program (computer) 10 is connected to a cache 12, a random access memory (RAM) 11, a hard disk drive (HDD) 13, a read only memory (ROM) 14, and a CPU 15 via a bus 16. The ROM 14 includes an encoding program that can exercise functions similar to those of the embodiments. In other words, as depicted in FIG. 7, the ROM 14 includes an orthogonal transformation/quantization program 14a, an inverse orthogonal transformation/inverse quantization program 14b, a motion compensation program 14c, a motion vector detection program 14d, a reference vector correction program 14e, a direct vector determination program 14f, a direct vector correction program 14g, a prediction mode determination program 14h, and a variable length coding program 14i.

The CPU 15 reads and executes the programs 14a to 14i, and thus the programs 14a to 14i, as depicted in FIG. 7, function as an orthogonal transformation/quantization process 15a, an inverse orthogonal transformation/inverse quantization process 15b, a motion compensation process 15c, a motion vector detection process 15d, a reference vector correction process 15e, a direct vector determination process 15f, a direct vector correction process 15g, a prediction mode determination process 15h, and a variable length coding process 15i. The processes 15a to 15i respectively correspond to the orthogonal transformation/quantization unit 111, the inverse orthogonal transformation/inverse quantization unit 112, the motion compensating unit 114, the motion vector detecting unit 115, the reference vector correcting unit 120, the direct vector determining unit 116, the direct vector correcting unit 121, the prediction mode determining unit 117, and the variable length coding unit 118, depicted in FIG. 2.

The RAM 11, as depicted in FIG. 7, includes a frame memory 11a and a frame memory 11b. The frame memory 11a and the frame memory 11b respectively correspond to the frame memory 110 and the frame memory 113 depicted in FIG. 2.

The computer programs 14a to 14i need not necessarily be stored in the ROM 14 in advance. For example, the computer programs 14a to 14i may be stored in a "portable physical medium" such as a flexible disk (FD), a compact disk read only memory (CD-ROM), a magneto optical (MO) disk, a digital versatile disk (DVD), an optical disk, and an integrated circuit (IC) card that can be inserted into the computer 10; in a "fixed physical medium" such as a hard disk drive (HDD) provided inside and outside of the computer 10; or in "another computer (or server)" connected to the computer 10 via a public line, the Internet, a local area network (LAN), or a wide area network (WAN). The computer 10 can read out each computer program, and execute the program.

As depicted in FIG. 8, a decoding program (computer) 20 having a configuration connected to a cache 22, a RAM 21, a HDD 23, a ROM 24, and a CPU 25, via a bus 26. The ROM 24 includes a decoding program that can exercise functions similar to those of the embodiments. In other words, as depicted in FIG. 8, the ROM 24 includes a variable length decoding program 24a, a prediction mode determination program 24b, an inverse orthogonal transformation/inverse quantization program 24c, a motion compensation program 24d, a vector determination program 24e, a reference vector correction program 24f, a direct vector determination program 24g, and a direct vector correction program 24h.

The CPU 25 reads and executes the computer programs 24a to 24h, and thus the computer programs 24a to 24h, as depicted in FIG. 8, function as a variable length decoding process 25a, a prediction mode determination process 25b, an inverse orthogonal transformation/inverse quantization process 25c, a motion compensation process 25d, a vector determination process 25e, a reference vector correction process 25f, a direct vector determination process 25g, and a direct vector correction process 25h. The processes 25a to 25h respectively correspond to the variable length decoding unit 210, the prediction mode determining unit 211, the inverse orthogonal transformation/inverse quantization unit 212, the motion compensating unit 214, the vector determining unit 213, the reference vector correcting unit 220, the direct vector determining unit 216, and the direct vector correcting unit 221 depicted in FIG. 4.

The RAM 21, as depicted in FIG. 8, includes a frame memory 21a. The frame memory 21a corresponds to the frame memory 215 depicted in FIG. 4.

The computer programs 24a to 24h need not necessarily be stored in the ROM 24 in advance. For example, the computer programs 24a to 24h may be stored in a "portable physical medium" such as a FD, a CD-ROM, an MO disk, a DVD, an optical disk, and an IC card that can be inserted into the computer 20; in a "fixed physical medium" such as a HDD provided inside and outside of the computer 20; or in "another computer (or server)" connected to the computer 20 via a public line, the Internet, a LAN, or a WAN. The computer 20 can read out each computer program, and execute the program.

As described above, the encoding apparatus and the decoding apparatus according to an embodiment can prevent the encoding efficiency from being decreased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An encoding apparatus having a direct mode as a prediction mode, the encoding apparatus comprising:
a reference vector correcting unit that, when a pixel with opposite parity is referred to for obtaining a reference vector in the direct mode, performs correction by adding or subtracting a value corresponding to a half pixel to or from a vertical component of a value of the obtained reference vector; and
a direct vector correcting unit that, when a pixel with opposite parity is referred to for obtaining a first and a second direct vector by temporally scaling the reference vector corrected by the reference vector correcting unit, performs correction by adding or subtracting a value corresponding to a half pixel to or from the vertical component of values of obtained direct vectors, wherein
the reference vector correcting unit performs correction on the reference vector by using $$mvCol\_correct = mvCol + 2 \times (isBottomFieldrefPicCol - isBottomFieldCol),$$

where mvCol is the reference vector, mvCol_correct is the corrected value of the reference vector, isBottomFieldrefPicCol is parity of a reference picture in first direct vector direction, and isBottomFieldCol is parity of a reference picture in second direct vector direction, and
the direct vector correcting unit performs correction on the first direct vector by using $$mvL0\_correct = mvCol\_correct \times tb/td, \text{where}$$

mvL0_correct is the corrected value of the first direct vector, tb is a time distance from a current picture to the reference picture in a past direction, and td is the time distance from the reference picture in a future direction to the reference picture in the past direction, and
the direct vector correcting unit performs correction on the second direct vector by using $$mvL1\_correct = mvL0\_correct - mvCol\_correct,$$

where mvL1_correct is the corrected value of the second direct vector.

2. A non-transitory computer readable storage medium containing instructions for encoding having a direct mode as a prediction mode, wherein the instructions, when executed by a computer, cause the computer to perform:
first performing, when a pixel with opposite parity is referred to for obtaining a reference vector in the direct mode, correction by adding or subtracting a value corresponding to a half pixel to or from a value of the obtained reference vector; and
second performing, when a pixel with opposite parity is referred to for obtaining a first and a second direct vector by temporally scaling the corrected reference vector, correction by adding or subtracting a value corresponding to a half pixel to or from values of obtained direct vectors, wherein
the first performing performs correction on the reference vector by using $$mvCol\_correct = mvCol + 2 \times (isBottomFieldrefPicCol - isBottomFieldCol),$$

where mvCol is the reference vector, mvCol_correct is the corrected value of the reference vector, isBottomFieldrefPicCol is parity of a reference picture in first direct vector direction, and isBottomFieldCol is parity of a reference picture in second direct vector direction, and
the second performing performs correction on the first direct vector by using $$mvL0\_correct = mvCol\_correct \times tb/td, \text{where}$$

mvL0_correct is the corrected value of the first direct vector, tb is a time distance from a current picture to the reference picture in a past direction, and td is the time distance from the reference picture in a future direction to the reference picture in the past direction, and
the second performing performs correction on the second direct vector by using $$mvL1\_correct = mvL0\_correct - mvCol\_correct,$$

where mvL1_correct is the corrected value of the second direct vector.

* * * * *